Sept. 12, 1950 A. E. SCHUBERT 2,521,951
CONTROL FOR PHOTOGRAPHIC RECORDING APPARATUS
Filed June 7, 1949 2 Sheets-Sheet 1
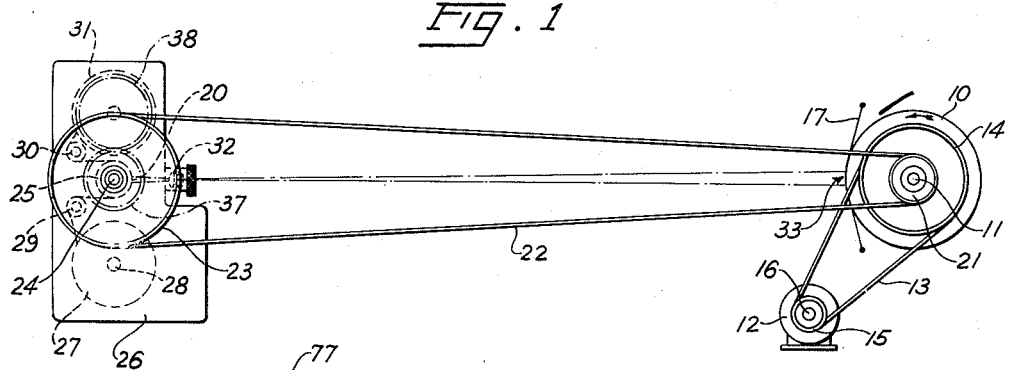
ALVIN E. SCHUBERT
INVENTOR
Daniel I. Marque
BY Lloyd F. Seeback
ATTORNEY & AGENT Sept. 12, 1950     A. E. SCHUBERT     2,521,951
CONTROL FOR PHOTOGRAPHIC RECORDING APPARATUS
Filed June 7, 1949     2 Sheets-Sheet 2
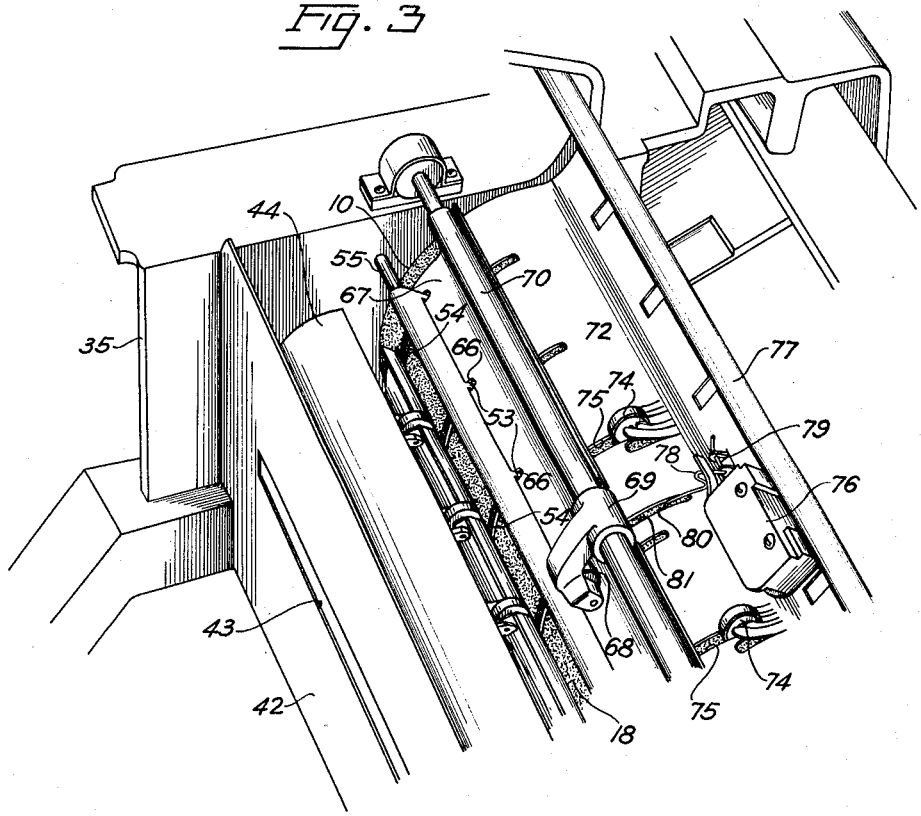
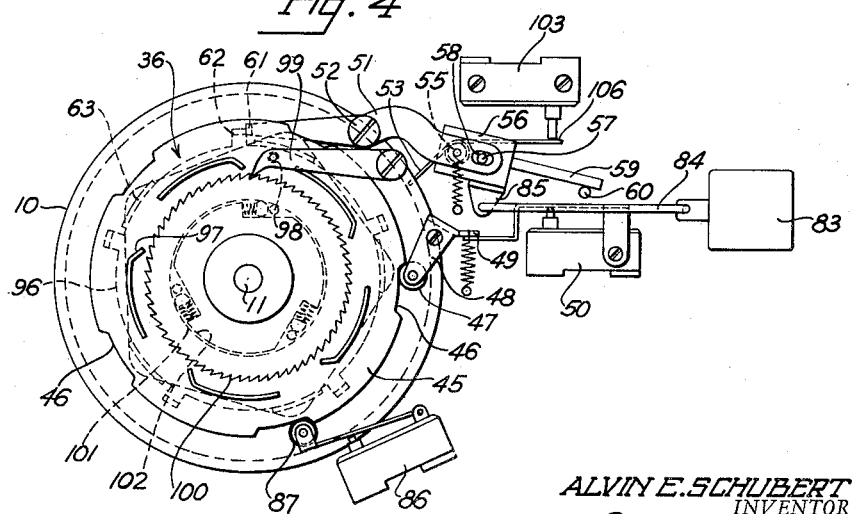
ALVIN E. SCHUBERT
INVENTOR
BY
ATTORNEY & AGENT Patented Sept. 12, 1950

2,521,951

UNITED STATES PATENT OFFICE 2,521,951

CONTROL FOR PHOTOGRAPHIC RECORDING APPARATUS

Alvin E. Schubert, Rochester, N. Y., assignor to Eastman Kodak Company, Rochester, N. Y., a corporation of New Jersey Application June 7, 1949, Serial No. 97,615

5 Claims. (Cl. 88—24)

This invention relates to a control for photographic recording apparatus and more particularly to a control in which the spacing between successive documents with respect to two document-controlled members determines the operating cycle for connection of the camera film drive.

In photographic recording apparatus, the document-advancing means is continuously driven, and it is not until a document approaches the photographic station that the film drive is connected to the document-advancing means so that the light-sensitive material in the camera is moved in synchronism with the document. The clutch means which is usually located between the document-advancing means and the film drive is actuated by the moving documents and usually has a predetermined operating cycle which permits the leading edge of the document to very closely approach the photographic station before the film drive is engaged, and which maintains the film drive operative until the trailing edge of the document has been moved out of the photographic field. With this arrangement the spacing between successive documents must be sufficient to permit recycling of the clutch mechanism; or, in other words, the spacing between successive documents must be such that the trailing edge of the document being photographed is out of the photographic station before the leading edge of the next document strikes the document-actuated fingers for again initiating the clutch means.

This arrangement does not lend itself readily to instances where the documents are fed into the apparatus at a high rate of speed, such as by means of an automatic feeder, or by hand by a skilled operator. In normal operation, the documents are fed at a rate whereby the spacing between successive documents is approximately one and one-half inches, but when the documents are fed by an automatic feeder, the spacing between successive documents is between one-half to three-quarters of an inch; thereby resulting in a greater number of exposures per minute. By providing a second document-controlled means in the document path, the trip fingers, which initiate the clutch means, are prevented from returning to their normal position while there is a continuous flow of documents but are allowed to return to a normal position to disengage the clutch means for stopping the film drive when there is an interruption in the feed. Thus, the present invention provides a simple way for attaining a higher rate of document feed.

The primary object of the present invention, therefore, is to provide a control means for photographic recording apparatus which will permit the clutch means connecting the document-advancing means and the film drive to operate in its normal cycle when successive documents are separated by a predetermined distance, and which will maintain the clutch means in an engaged position as long as the spacing between successive documents is less than the predetermined distance.

Another object of the invention is to provide a control means for photographic recording apparatus which comprises a document-controlled means for initiating the operating cycle of the clutch means connecting the document advancing means and the film drive, and a second document-controlled means which will maintain the first-mentioned document-controlled means in its controlled position as long as the distance between successive documents is less than the distance between said document-controlled means.

A further object of the invention is to provide a control means for photographic recording apparatus which comprises a holding circuit for maintaining the document-controlled means in its controlled position, in which position the clutch means is engaged for moving the film drive as long as the spacing between successive documents is less than a predetermined distance.

A still further object of the invention is to provide a control means for photographic recording apparatus which comprises a holding circuit including a solenoid connected to the document trip fingers and energized by a document under a document-controlled means for holding the trip fingers in their controlled position for maintaining the clutch means engaged and the illuminating means energized as long as the spacing between successive documents is less than the distance between the trip fingers and the document controlled means.

Other objects of the invention will be suggested to those skilled in the art by the following disclosure.

The above and other objects of the invention are embodied in photographic recording apparatus having a feeding station, a photographing station, and an exposure position in combination with a feeding means for moving the document continuously through the photographic station, an advancing means for light-sensitive material, a clutch means between the feeding means and the advancing means, a document-controlled means for initiating the clutch means into engagement upon movement into a controlled position, and into disengagement upon return to a normal position, and a second document-controlled means operatively connected to and maintaining the first-mentioned document-controlled means in its controlled position as long as the spacing between successive documents is less than a predetermined distance along said feeding means. The addition of the second document-controlled means thereby permits feeding documents at a normal rate or at an increased rate to obtain more exposures per minute.

Reference is now made to the accompanying drawings wherein like reference numerals designate like parts, and wherein:

Fig. 1 is a schematic side elevation of a photographic recording apparatus;

Fig. 2 is a vertical section through the feeding means showing the location of the document-controlled or actuated means with respect to the feeding and photographic stations;

Fig. 3 is a partial plan perspective of the vertical section of Fig. 2;

Fig. 4 is an end elevation of the clutch means showing the arrangement of the various control elements; and Fig. 5 is a wiring diagram showing the holding circuit initiated by the second document-controlled means.

Similarly to other document-recording apparatus, the apparatus disclosed includes a feeding station, a photographic station, an exposure position, a feeding means for moving documents through the photographic field, an advancing means for moving light-sensitive material through an exposure position, and a clutch means between the feeding means and the advancing means. The clutch means which is preferred is similar to that disclosed in U. S. Patent No. 1,976,346, issued to C. J. Hughey on October 9, 1934, and the illuminating system is similar to that disclosed in the pending application entitled, Illumination Control for Photographic Copying Apparatus, Serial No. 659,900, filed April 5, 1946, in the name of A. E. Schubert et al., now Patent No. 2,481,694, issued September 13, 1949.

The feeding means which is preferred is similar to that disclosed in U. S. Patent No. 1,957,889, issued to Hopkins et al. on May 8, 1934, for a Photographic Recording Apparatus. Such a feeding means may include a feeding drum 10 which is mounted on shaft 11 and which is driven by the motor 12 through chain or belt 13 encircling sprockets or pulleys 14 and 15 on shaft 11 and motor shaft 16, respectively. A plurality of wires 17 under suitable tension may extend part way around the periphery of drum 10 and hold the documents against an outer layer 18 of material having a high coefficient of friction, such as cork.

The advancing means, see Fig. 1, for moving the light-sensitive material continuously through an exposure position 20 comprises a sprocket 21 fixed to shaft 11 and connected by an endless chain 22 to sprocket 23 on shaft 24 which, in turn, may be connected in any suitable manner to film drive roller 25 within the film unit 26.

The film unit 26 may be constructed in any well-known manner, but is preferably of the type disclosed in the aforementioned Hopkins' patent. Such a camera includes a supply roll 27 mounted on spindle 28 and a pair of guide rollers 29 and 30. The film path in such a film unit is from the supply roll 27, around guide roller 29, around film drive roller 25, around roller 30 and to the take-up roll 31. An objective member 32 is mounted in the front wall of film unit 26 and has optical characteristics corresponding to the distance between the photographic station, as designated by the numeral 33, and the exposure position 20 on roller 25. The limiting rays through the objective for the photographic station and exposure position are indicated by broken lines in Fig. 1.

The feed drum 10 is mounted between side frames 35, only one of which is shown in Fig. 3, and the drive from motor 12 is transmitted through a clutch means, designated broadly by the numeral 36 in Fig. 4, on shaft 11 as disclosed in the above-mentioned Hughey patent. This clutch arrangement accomplishes the connection between the feeding means and the advancing means so that sprocket 21, sprocket 23, roller 25, and take-up roll 31 are rotated. The ratio between sprockets 21 and 23 and gears 37 and 38 may be readily determined so that the light-sensitive material is advanced in synchronism with the movement of the document through the photographic field.

The illuminating means comprises a bank of lamps 40 which are in two groups and connected in parallel circuit. Lamps 40 are mounted in-line and parallel to the axis of drum 10 on bracket 41 secured to partition 42 which is provided with an aperture 43. A reflector 44 is mounted on partition 42 for reflecting as much of the stray light as possible toward the photographic station 33, at which station the document is moved under glass plate 33'.

The clutch-supervising means, see Fig. 4, comprises a control disk 45 which is mounted on shaft 11 and constitutes a part of the clutch means. The periphery of disk 45 is provided with a plurality of dwells 46 which operate cam roller 47 mounted on the pivoted bracket 48, tail 49 of which operates the normally-closed switch 50, which is shown in its closed position in Fig. 5.

The document-controlled means is adapted to assume a normal position for blocking the control member of the control clutch but is movable by passage of a document on drum 10 to a position in which it abuts, after a predetermined rotation of the control member, one of the projections, thereon. Such a control member preferably includes an arm 51 which is intermediately pivoted to a post extending from side frame 35 by means of bolt 52. A plurality of fingers 53 which extend into grooves 54 in the drum 10 are mounted on shaft 55 which is journalled in side frames 35 and which has fixed to one end thereof a counterweight 56. The counterweight 56 carries pin 57 which engages slot 58 in the end of arm 51 and has a rod 59 attached thereto which rests upon stud 60 so that arm 51 and fingers 53 are normally maintained in the position shown in Figs. 2 and 4. The other end of arm 51 has a lip 61 which is adapted to alternately engage lugs 62 and 63 on the clutch control member 96.

From Figs. 2 and 3, it will be noted that the fingers 53 are spaced from the photographic station 33 and extend through suitable slots 66 in a curved plate 67. The straightening roller 68 is rotatably mounted in bracket 69 which is pivotally mounted on rod 70 journalled on side frames 35 and cooperates with fingers 53 to straighten the document before it passes under said fingers in a well-known manner. The plate 67 also serves to maintain the document in contact with drum 10 and to assist in directing it to the photographic station. A pressure plate 72 is spaced from drum 10 and is mounted between side frames 35 and between plate 73, which may be broadly designated as the feeding station, and plate 67. A plurality of rollers 74 are carried by said plate 72 which extend through suitable slots 75 therein for engaging the drum and assisting in advancing the document. A switch 76 is secured in any suitable manner to the transverse rod 77 and is actuated by arm 78 which is pivotally secured on plate 72 at 79 and which has an end 80 protruding through slot 81 for a purpose to be described hereinafter.

A solenoid 83, which is mounted on side frame 35, is connected by link 84 to an extension 85 secured to counterweight 56 and, when energized, serves to hold fingers 53 in their controlled position. Solenoid 83 is energized by the closing of switch 86 whose actuating roller 87 is in engagement with disk 45. The second document-controlled means, therefore, comprises the switch 76 which is actuated by the moving document, the switch 86 which energizes solenoid 83, and the solenoid 83 which is connected to the fingers 53. The manner in which these elements are connected electrically comprises a holding circuit as will be evident from the description which follows.

The normal operation of the control arrangement for the clutch means is as follows: The switch 90 in line 91, see Fig. 5, is closed to energize motor 12 which is connected across lines 91 and 92. The document is introduced from plate 73 onto drum 10 and is moved therewith under the end 80 of arm 78 to close switch 76 in line 93, thereby actuating the electric counter 94 in line 95. The document is straightened as it strikes the fingers 53 by roller 68 in a well-known manner. The leading edge of the document trips fingers 53 and through pin 57 and slot 58 rotates arm 51 in a clockwise direction so that lip 61 no longer abuts lug 62. The springs of the control clutch now permit engagement between the elements of the control clutch and the control clutch control member or circular plate 96 to permit a predetermined rotation. The control disk also executes such a predetermined rotation and the portion 97 of control disk 45 raises pin 98 and pawl 99 out of engagement with the toothed periphery of the power clutch control member 100. This permits the engagement of the elements 101 and 102 of the power clutch so that the sprockets 21 and 23 are driven to move the film strip in unit 26 in synchronism with the document being moved by drum 10. Thus, it will be noted that there is a predetermined delay between the tripping of fingers 53 and the engagement of the power clutch to operate the film unit drive. This leading interval permits the document to move into the photographic field and eliminates the necessity of locating fingers 53 within the photographic field. Rotation of the control clutch control member continues until lug 63 comes into contact with lip 61, whereupon the control clutch is disengaged, but the power clutch continues to drive the advancing means for the light-sensitive material.

After the rear or trailing edge of the document passes the end 80 of arm 78, counter 94 is deenergized, and as it passes fingers 53, said fingers return to their normal position and lip 61 moves out of contact with lug 63. This permits engagement of the control clutch and the consequent predetermined rotation of the control member 96 and control disk 45. As the predetermined rotation proceeds, the portion 97 permits pawl 99 to engage the teeth of plate 100 to disengage the power clutch and the succeeding lug 62 comes into contact with lip 61 to accomplish disengagement of the control clutch. Again the delayed action for disengagement of the clutches which is provided by the predetermined rotation is selected so that the rear edge of the document has an opportunity to pass through the photographing station before the film unit drive is disconnected. As long as the distance between successive documents is greater than the peripheral distance on drum 10 between the end 80 of arm 78 and fingers 53, the film drive is initiated after a predetermined interval by the leading edge of the document and stopped after a predetermined interval by the trailing edge of the document.

The control disk 45 controls the operation of the normally-closed switch 50, and fingers 53 control the operation of normally-open switch 103. Both of these switches are connected in the circuit for lamps 40, as shown in Fig. 5. Between document exposures switch 103 is closed and switch 50 is open so that the current flow is through line 91, line 104, resistance $R_1$, resistance $R_2$, line 105, and lamps 40 to line 92. This circuit applies a low voltage which maintains the filaments heated to a dull red glow. When fingers 53 are tripped, the extension 106 on shaft 55 closes switch 103, and the current flow is through line 107, switch 50, switch 103, resistance $R_3$, line 105 and lamps 40 to line 91. This circuit overvolts the lamps during the period the leading edge of the document is moving from the fingers 53 to the photographic station to bring said lamps up to full brilliance quickly. As roller 47 is moved from the dwell 46 upon rotation of disk 45, the tail 49 permits switch 50 to move to its open position, and the current flow is then through line 107, switch 50, line 108, resistance $R_2$, line 105, and lamps 40 to line 92. This circuit is maintained as long as the film drive is engaged and maintains the lamps at a normal operating voltage for correct exposure. The actuation of this circuit takes place just before the document enters the photographic field.

When successive documents are fed into the apparatus so that the spacing therebetween is less than the peripheral distance on drum 10 between the end 80 of arm 78 and fingers 53, the second document-controlled means becomes operative to prevent re-cycling of the clutch means. As pointed out above, the leading edge of the first document strikes the end 80 of arm 78 to close switch 76, thereby energizing counter 94. Arm 78 is maintained in this position as long as a document is thereunder. The document is advanced by drum 10 until the leading edge contacts the fingers 53, at which time the lip 61 is removed from lug 62 and the control clutch is engaged for a predetermined interval as described above. When the power clutch is engaged, the roller 87 will have been moved out of dwell 46, thereby closing switch 86 and energizing solenoid 83 which through link 84 will rotate shaft 55 and fingers 53 in a counterclockwise direction to maintain said fingers in the controlled position.

As the trailing edge of the first document leaves end 80, switch 76 returns to its open position, thereby breaking the circuit through line 93 and deenergizing counter 94 and solenoid 83. Since the document is still under fingers 53, the power clutch remains engaged. If the leading edge of the next document is spaced from the trailing edge of the first document by a distance less than that between end 80 of arm 78 and fingers 53, then the leading edge of the second document will again close switch 76 to energize counter 94 and solenoid 83 before the trailing edge of the first document leaves fingers 53. Solenoid 83, therefore, maintains fingers 53 in their controlled position until the trailing edge of the second document leaves end 80, at which time the document will hold said fingers in their controlled position.

As long as the spacing between successive documents is less than the distance on the drum periphery between end 80 and fingers 53, or as long as the spacing between successive documents is such that the leading edge of the document being fed into the machine contacts arm 80 before the trailing edge of the preceding document leaves fingers 53, the switch 76 will be closed by the leading edge of the document and opened by the trailing edge, and fingers 53 will be continually maintained in their controlled position by either the document under said fingers, or by solenoid 83. As a result, control disk 45 is maintained in a fixed position by the engagement of lip 61 with lug 63 so that the power clutch is continuously engaged and cam roller 47 and switch roller 87 are maintained on the periphery of disk 45 so that switches 50 and 86 are held closed. With switch 50 held closed, lamps 40 are continuously energized through resistance $R_2$ and switch 50, even though switch 103 is held closed.

If at any time during a run of documents the spacing between successive documents should revert to their normal spacing, fingers 53 will then return to their normal position, thereby releasing control member 96, disengaging the power clutch, and permitting the control member 96 and control disk to make a predetermined rotation before the control clutch is disengaged. At the same time rollers 47 and 87 will have entered their respective dwells 46, and switches 86 and 50 will have returned to their normally-open positions.

The switch 76 and arm 78 which is actuated by the document constitutes a second document-controlled means which is operatively connected by means of solenoid 83 to the first document-controlled means or fingers 53 for maintaining them in their controlled position when the spacing between successive documents is less than a predetermined distance. The holding circuit for accomplishing the same result comprises switches 76 and 86 and solenoid 83 which are connected in series circuit in line 93 across lines 91 and 92, as shown in Fig. 5. It is to be understood, of course, that the distance between end 80 of arm 78 and fingers 53 must also be less than the width of the shortest document being photographed to provide an operative structure.

It can be readily appreciated that the additional document-controlled means and holding circuit provides a very convenient manner of photographing documents at a normal rate, or at an increased rate, the rate being determined solely by the spacing between successive documents. Also, the additional document-controlled means does not have to be associated with a clutch means in which there is a predetermined lag controlled by the document before the film drive is engaged or disengaged, but can be readily adapted to a clutch means in which the clutch means is controlled by fingers adjacent or in the photographic station.

Since other modifications of the invention are possible, the scope of the invention is not to be limited to the illustrated embodiment but is defined by the appended claims.

Having now particularly described my invention, what I desire to secure by Letters Patent of the United States and what I claim is:

1. In an apparatus for photographically reproducing documents and having a feeding station, a photographic field and an exposure position, the combination with a feeding means for moving a document continuously through said photographic field, an advancing means for moving light sensitive material through said exposure position, and a clutch means between said feeding means and said advancing means, of a document controlled means spaced from said photographic field, movable by the leading edge of a document to a controlled position for initiating and maintaining said clutch means in its engaged position and movable to a normal position after passage of said document for disengaging said clutch means, and a holding circuit for maintaining said document controlled means in said controlled position including, in series circuit, a switch means between said feeding station and said document controlled means and adapted to be actuated and held in a closed position by said document, a second switch means adapted to be actuated and held in a closed position by said clutch means in its engaged position, and a solenoid operatively connected to said document controlled means and adapted to be energized only when a document is under said first-mentioned switch means and the spacing between successive documents is less than the distance between said first-mentioned switch means and said document controlled means.

2. In an apparatus for photographically reproducing documents and having a feeding station, a photographic field and an exposure position, the combination with a feeding means for moving a document continuously through said photographic field, an illuminating means for said photographic field, an advancing means for moving light sensitive material through said exposure position, and a clutch means between said feeding means and said advancing means, of a document controlled means spaced from said photographic field, movable by the leading edge of a document to a controlled position for initiating and maintaining said clutch means in its engaged position and for energizing said illuminating means, and movable to a normal position after passage of said document for disengaging said clutch means and for deenergizing said illuminating means, and a holding circuit for maintaining said document controlled means in said controlled position including, in series circuit, a switch means between said feeding station and said document controlled means and adapted to be actuated and held in a closed position by said document, a second switch means adapted to be actuated and held in a closed position by said clutch means in its engaged position, and a solenoid operatively connected to said document controlled means and adapted to be energized only when a document is under said first mentioned switch means and the spacing between successive documents is less than the distance between said first-mentioned switch means and said document controlled means.

3. In an apparatus for photographically reproducing documents and having a feeding station, a photographic field and an exposure position, the combination with a feeding means for moving a document continuously through said photographic field, an advancing means for moving light sensitive material through said exposure position, and a clutch means between said feeding means and said advancing means, of a clutch supervising means movable to respective positions for the engagement and disengagement of said clutch means, a driven member for cooperating with said clutch supervising means, adapted after a predetermined operating cycle to move said clutch supervising means into position for engagement of said clutch means and adapted after a successive predetermined operating cycle to move said clutch supervising means into position for disengagement of said clutch means, a document controlled means spaced from said photographic field, movable by the leading edge of a document to a controlled position for initiating the first-mentioned operating cycle, and movable to a normal position after passage of said document for initiating said second-mentioned operating cycle, and a holding circuit for maintaining said document controlled means in said controlled position including, in series circuit, a switch means between said feeding station and said document controlled means and adapted to be actuated and held in a closed position by said document, a second switch means adapted to be held in a closed position by said clutch means in its engaged position, and a solenoid operatively connected to said document controlled means and adapted to be energized only when a document is under said first mentioned switch means and the spacing between successive documents is less than the distance between said first-mentioned switch means and said document controlled means.

4. In an apparatus for photographically reproducing documents and having a feeding station, a photographic field and an exposure position, the combination with a feeding means for moving a document continuously through said photographic field, an advancing means for moving light sensitive material through said exposure position, and a clutch means between said feeding means and said advancing means, of a clutch supervising means movable to a position for the engagement of said clutch means, a driven member for cooperating with said clutch supervising means and adapted after a predetermined operating cycle to move said clutch supervising means into position for engagement of said clutch means, a document controlled means spaced from said photographic field and movable by the leading edge of a document to a controlled position for initiating said operating cycle, and a holding circuit for maintaining said document controlled means in said controlled position including, in series circuit, a switch means between said feeding station and said document controlled means and adapted to be actuated and held in a closed position by said document, a second switch means adapted to be actuated and held in a closed position by said clutch means in its engaged position, and a solenoid operatively connected to said document controlled means and adapted to be energized only when a document is under said first mentioned switch means and the spacing between successive documents is less than the distance between said first-mentioned switch means and said document controlled means.

5. In an apparatus for photographically reproducing documents and having a feeding station, a photographic field and an exposure position, the combination with a feeding means for moving a document continuously through said photographic field, an advancing means for moving light sensitive material through said exposure position, and a clutch means between said feeding means and said advancing means, of a clutch supervising means movable to a position for disengagement of said clutch means, a driven member for cooperating with said clutch supervising means and adapted after a predetermined operating cycle to move said clutch supervising means into position for disengagement of said clutch means, a document controlled means spaced from said photographic field and movable from a controlled position to a normal position after passage of a document for initiating said operating cycle, and a holding circuit for maintaining said document controlled means in said controlled position including, in series circuit, a switch means between said feeding station and said document controlled means and adapted to be actuated and held in a closed position by said document, a second switch means adapted to be actuated and held in a closed position by said clutch means in its engaged position, and a solenoid operatively connected to said document controlled means and adapted to be energized only when a document is under said first mentioned switch means and the spacing between successive documents is less than the distance between said first-mentioned switch means and said document controlled means.

ALVIN E. SCHUBERT.

REFERENCES CITED

The following references are of record in the file of this patent:

UNITED STATES PATENTS

| Number | Name | Date |
| --- | --- | --- |
| 1,957,889 | Hopkins | May 8, 1934 |
| 2,377,525 | Schutt | June 5, 1945 |
| 2,478,641 | Rose | Aug. 9, 1949 |